Feb. 26, 1952  F. T. COURT  2,586,919
PLOW
Filed May 10, 1944  6 Sheets-Sheet 2
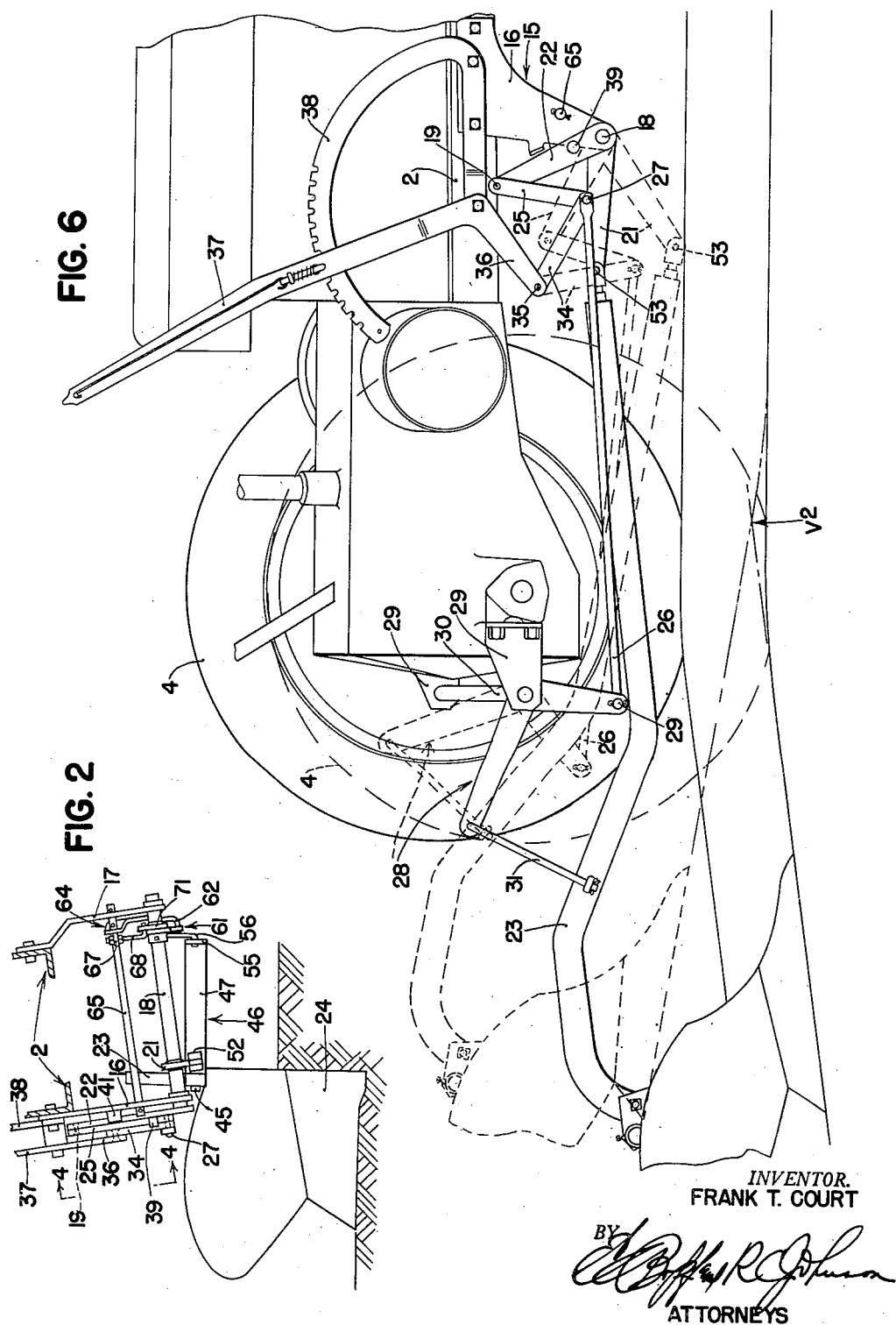
INVENTOR.
FRANK T. COURT
ATTORNEYS

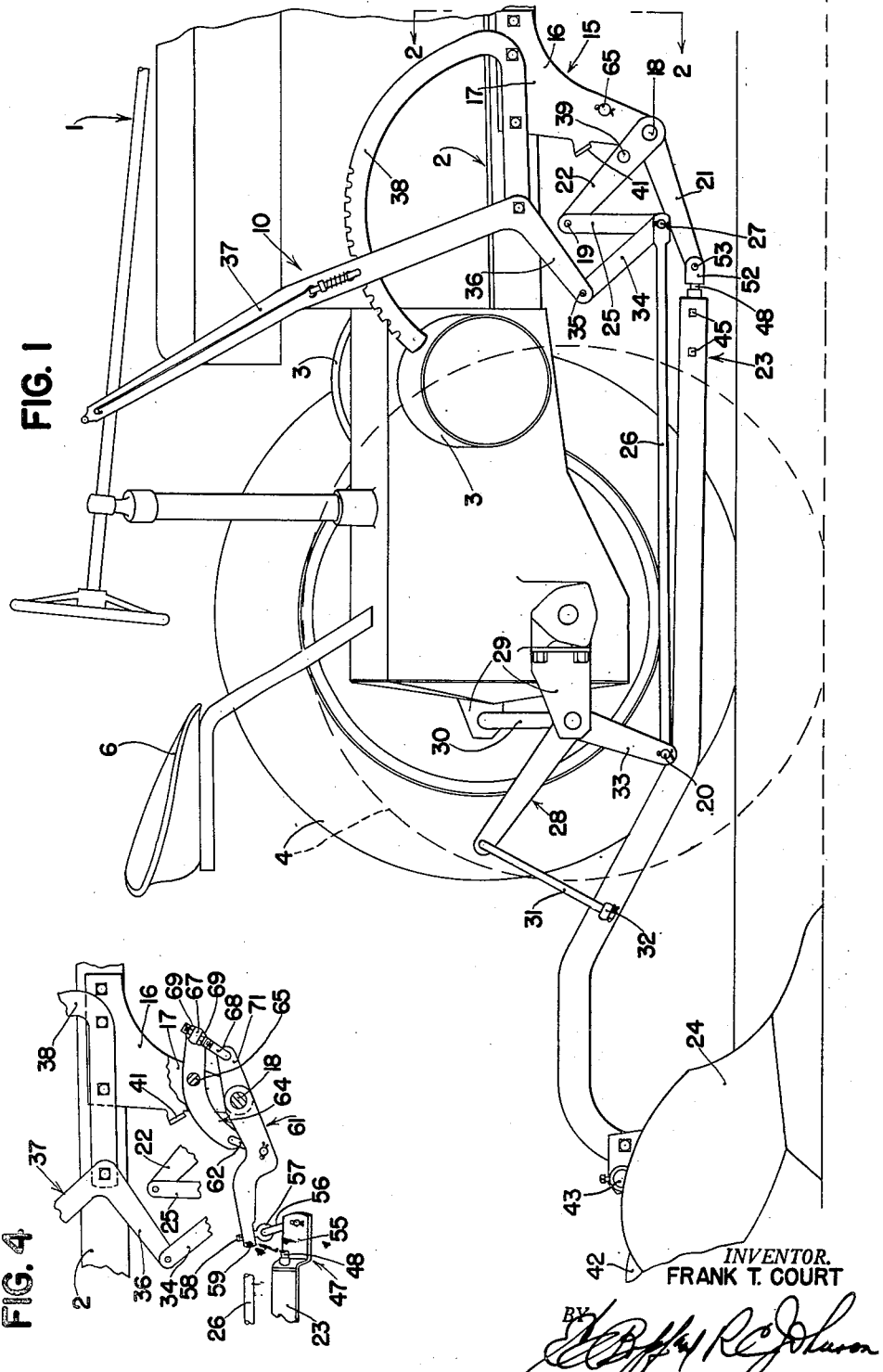

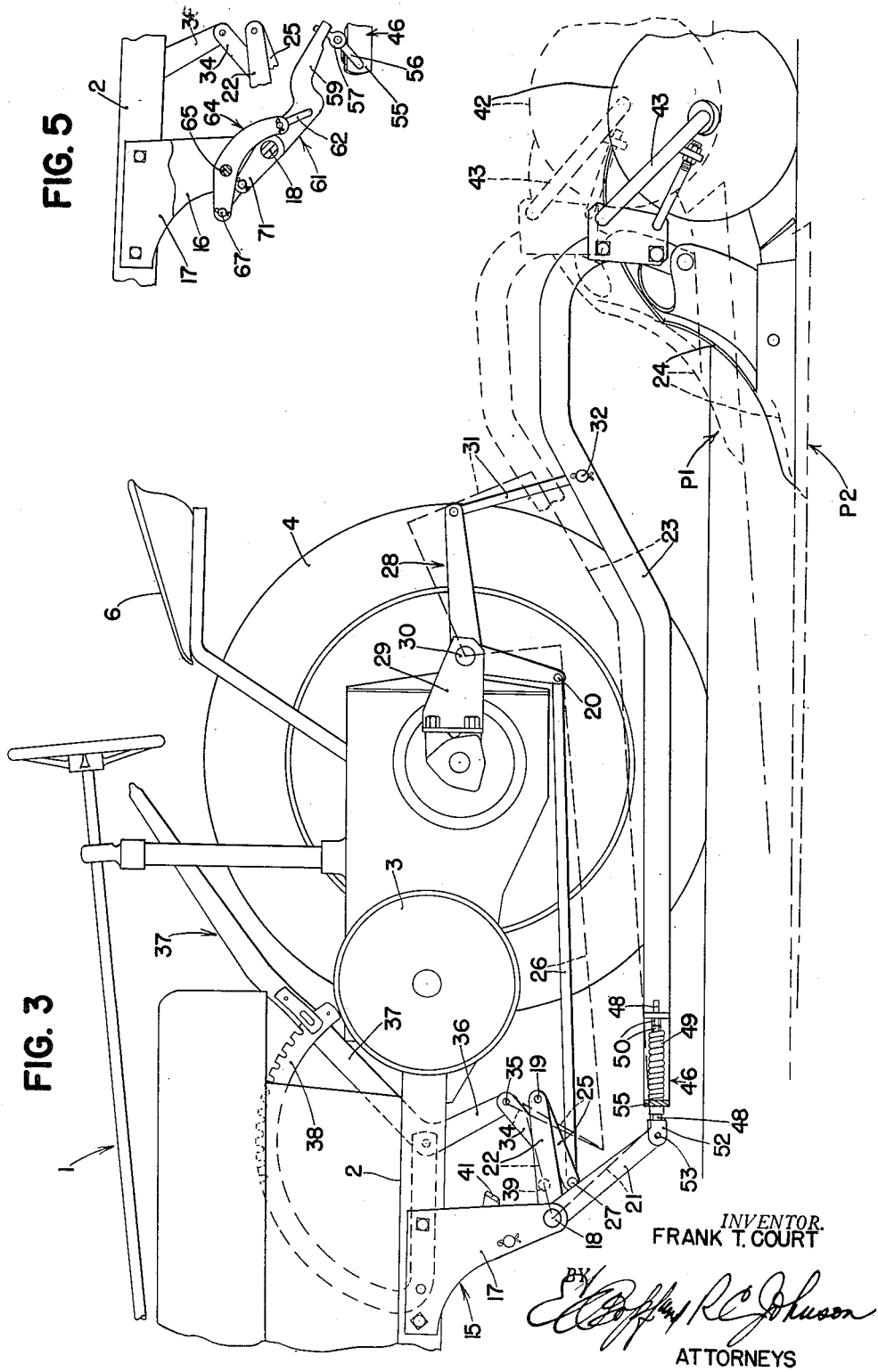

Feb. 26, 1952     F T. COURT     2,586,919
PLOW
Filed May 10, 1944                                6 Sheets—Sheet 4
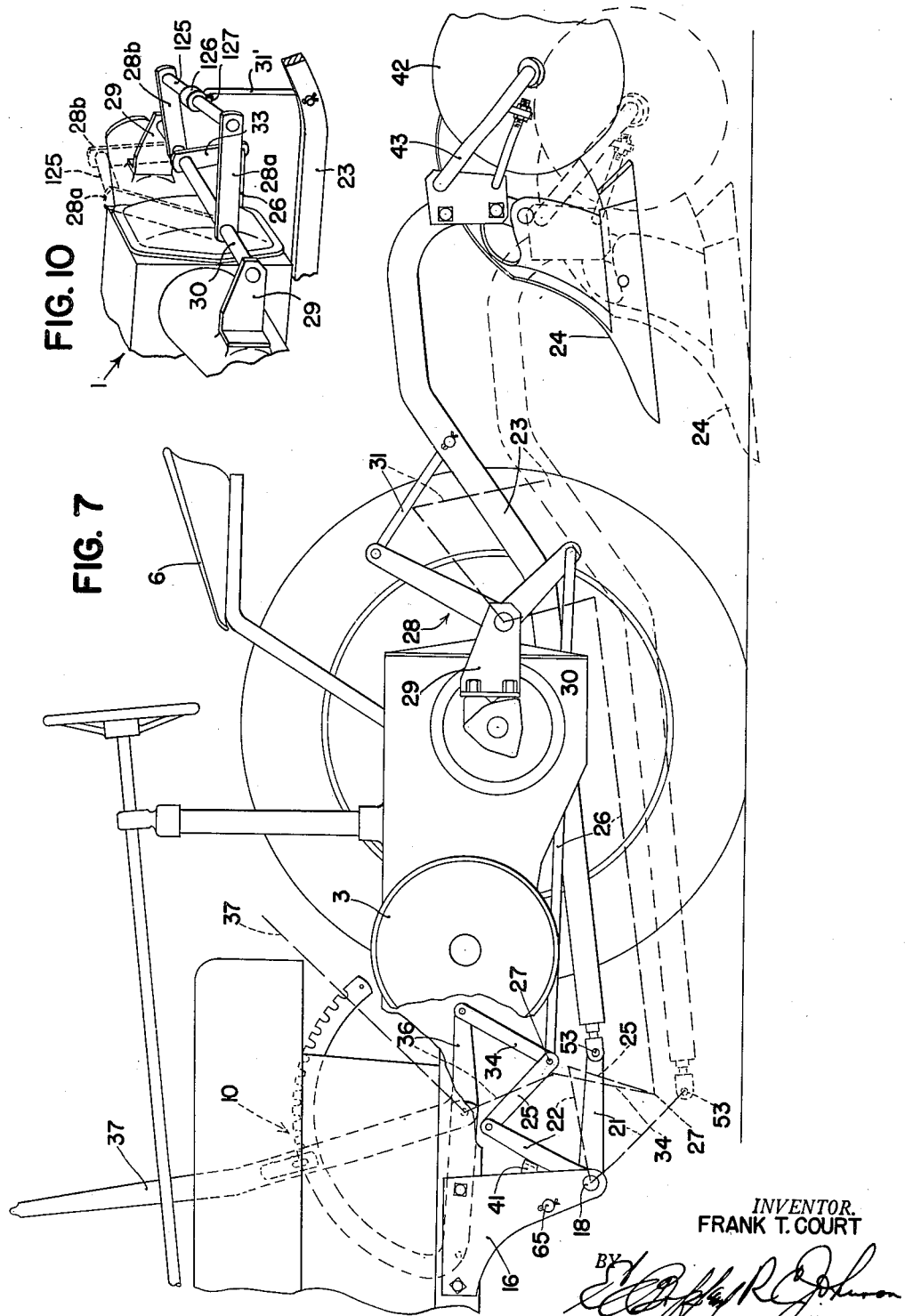
INVENTOR.
FRANK T. COURT
ATTORNEYS

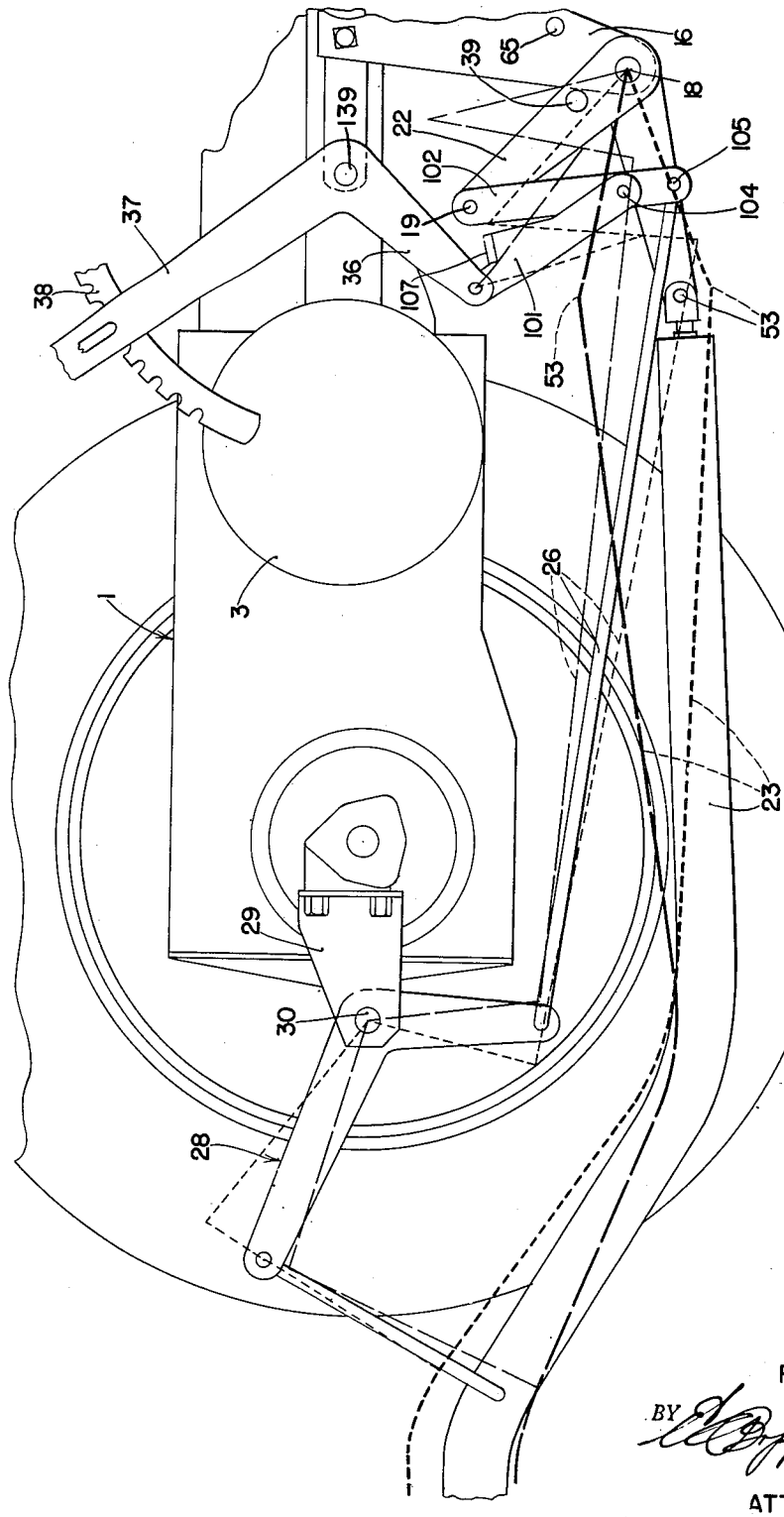

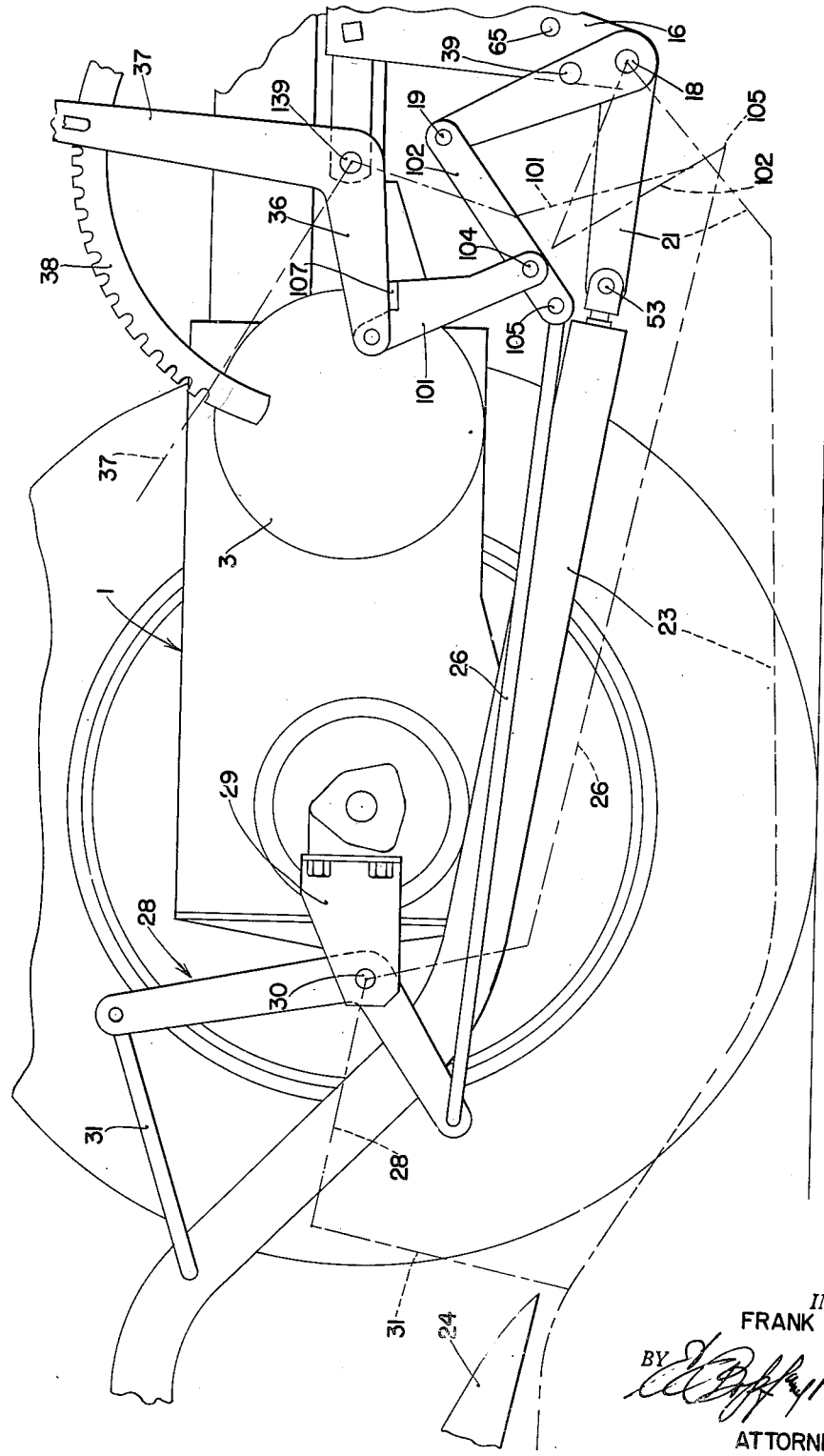

Patented Feb. 26, 1952

2,586,919

UNITED STATES PATENT OFFICE 2,586,919

PLOW

Frank T. Court, Moline, Ill., assignor to Deere & Company, Moline, Ill., a corporation of Illinois Application May 10, 1944, Serial No. 534,948

20 Claims. (Cl. 97—47)

The present invention relates generally to agricultural implements and more particularly to tractor mounted plows.

The object and general nature of the present invention is the provision of an agricultural implement of the integral or tractor mounted type wherein improved raising, lowering and controlling mechanism is provided for adjusting the position of the ground working tool. More specifically, it is an important feature of the present invention to provide a draft transmitting linkage between the tool and the tractor wherein the tool is capable of relatively free floating movement with respect to the tractor generally about a virtual hitch point that is spaced from any actual physical connection and disposed relatively close to the ground surface and adjacent the rear traction wheels of the tractor when the plow is in its normal operating or plowing position. Additionally, it is a feature of this invention to provide improved raising connections whereby, when it is desired to raise the plow out of the ground, the front end of the plow is first raised, so that the plow, due to the forward travel of the outfit, tends to run out of the ground, followed by the actual lifting of the plow bottom into its transport or raised position.

A further and important object of the present invention is the provision of draft and controlling linkage so arranged as to be capable of being moved into a position to lower the hitch point of the plow below its normal position, thereby conditioning the implement for opening up the land on the first round. It will be understood that in normal operation with a tractor mounted plow, one side of the tractor normally runs in the previously opened furrow but in opening up the land the first time around all wheels of the tractor run on the surface of the ground. It is another feature of this invention to provide draft and controlling linkage arranged so that when the plow is operated with the hitch point lowered, as for opening up the land, the plow runs level and is not affected by small irregularities in the ground surface over which the outfit passes, but the linkage is such, nevertheless, that when in normal operation, with one wheel of the tractor running in the previously opened furrow, the rear tractor wheel of the tractor actually serves as a gauge wheel for the plow, and the furrow opener follows the rear tractor wheel as it runs along the previously opened furrow.

Still further, another feature of the present invention is the provision of means for automatically maintaining the plow level during normal operation, which means automatically responds to changes in the plowing depth, and it is a still further feature of this invention to provide the automatic leveling linkage so constructed and arranged that when the hitch point is lowered, as when opening up the land, the automatic leveling is eliminated and the plow held in an upright position in any of the several possible operating depths when opening up the land.

These and other objects and advantages of the present invention will be apparent to those skilled in the art after a consideration of the following detailed description of the preferred embodiment, taken in conjunction with the accompanying drawings.

In the drawings:

Figure 1 is a side view of the tractor propelled outfit in which the principles of the present invention have been incorporated, the plow being shown in a normal operating position.

Figure 2 is a sectional view taken generally along the line 2—2 of Figure 1 and showing in particular the leveling linkage.

Figure 3 is a view similar to Figure 1 but taken from the other side of the tractor, showing the relative positions of the parts when opening up the land the first time around.

Figure 4 is a fragmentary detail view showing the leveling linkage when the plow is in the position shown in Figure 1, Figure 4 being a view taken generally along the line 4—4 of Figure 2.

Figure 5 is a view similar to Figure 4 but showing the leveling linkage in the position it occupies when the plow is opening up the land, as shown in Figure 3.

Figure 6 is a view showing the manner in which the plow body swings generally about a virtual hitch point that in normal operating position lies closely adjacent the ground surface at or near the adjacent rear tractor wheel.

Figure 7 shows the outfit when it is arranged for transport.

Figures 8 and 9 show a modified form of the invention.

Figure 10 shows a modified form of connection between the rear portion of the plow beam and the tractor, wherein the plow beam is permitted to swing laterally through a considerable extent with respect to the tractor, thereby providing an arrangement wherein the outfit may travel around fairly sharp curves without pulling the plow out of the ground.

The tractor is indicated in its entirety by the reference numeral 1 and serves as a mobile support for implements and the like. The tractor or mobile support includes a supporting frame 2 carrying a source of power 3, and the tractor is equipped with rear traction wheels 4 and front steering or dirigible wheels (not shown). The operator's station on the tractor is indicated by the reference numeral 6. The tractor 1 may be provided with a hydraulic power lift unit deriving operating energy from a fluid pump (not shown) driven by the tractor motor, but for purposes of illustrating the principles of the present invention I have shown a hand lift 10. It will be understood that the mechanism 10 is illustrative of any type of lift, hydraulic, electric, or otherwise, in which a part is adapted to be moved, by power or otherwise, into any one of several positions and locked against movement in either direction from that position, and into a raised position, all under the control of the operator.

Coming now to the features with which the present invention is more particularly concerned, a draft bracket 15 is carried by the tractor frame and may be of any suitable construction. Preferably, the bracket 15 comprises right and left hand plates 16 and 17 bolted at their upper ends to the frame of the tractor. The lower end of each of the bracket plates 16 and 17 is apertured to receive a rockshaft 18 that is journaled for rocking movement therein. A pair of arms 21 and 22 are rigidly fixed to the rockshaft 18, serving thereby as a bell crank swingably carried by the tractor. The rockshaft 18 and bell crank structure 21, 22 serve as a shiftable hitch member or draft transmitting means for transmitting draft to a plow or other implement connected with the tractor, and in the structure shown as illustrating the principles of the present invention the arm 21 constitutes the chief draft transmitting member by which draft is transmitted from the tractor 1 to the plow beam 23, the rear end of which carries a plow bottom 24. The other arm 22 is connected by linkage comprising a pair of swingable links 25 and 26 to a shiftable part or member in the form of a bell crank 28. The links 25 and 26 are pivotally interconnected as at 27. The bell crank 28 is fixed to a cross shaft 30 mounted on a pair of brackets 29 or other suitable support carried at the rear of the tractor. A link 31 extends downwardly from the upper arm of the bell crank 28 and is pivotally connected, as at 32, to the rear portion of the plow beam 23. As best shown in Figure 6, the upper arm of the rear bell crank member 28 and the lower or draft-transmitting arm 21 of the forward bell crank member 21, 22 normally move generally vertically while the other arm 33 of the member 28 and the upper arm 22 move generally fore and aft. The bell cranks 28 and 21, 22 and associated parts serve as lifting connections extending between the tractor and the front and rear portions of the plow beam because, as explained below and as illustrated in Figure 7, operation of the lever 37 acts through them to lift the plow into its transport or inoperative position. A link 34 is apertured to receive the pin 27 pivotally connecting the links 25 and 26 and extends upwardly and is pivoted, as at 35, to an arm 36 which serves as the actuating member for the plow-controlling linkage just described. The arm 36 is a part of a hand lever 37 adapted to be latched in different positions to a sector 38 carried by the tractor 1. The link 25 is pivoted at 19 to the outer end of the arm 22, and the link 26 is pivoted at 20 to the lower arm 33 of the bell crank 28. A stop 39 on the arm 22 limits the forward movement of the link 25 relative to the arm 22 and keeps the four pivots 35, 19, 27 and 18 from getting in a straight line at any time. A stop 41 is fixed to the bracket brace 16 and serves to limit the upward swinging movement of the arm 22. A rear gauge wheel 42 is connected by a crank axle 43 to the rear end of the beam 23 and serves as a rolling landside for the plow.

The mechanism for automatically leveling the plow will now be described. Referring first to Figure 2, a draft bracket 46 is secured by bolts 45 to the front end of the plow beam 23 and includes a laterally directed portion in the form of an extension 47 which is apertured to receive a draft bolt 48 (Figures 1 and 3). A cushioning spring 49 is disposed about the draft bolt 48 and is confined between a pair of lock nuts 50 and the lateral extension 47. The head of the bolt 48 includes a yoke 52 apertured to receive a hitch pin 53 that passes through an aperture in the rear end of the draft arm 21. The laterally extended bracket section 47 terminates in a forwardly extending apertured end 55 in which aperture the lower end of a link 56 is loosely received. The upper end of the link 56 is loosely received in the eye 57 of a swivel 58 carried in the rear upwardly extended end 59 of a leveling arm 61. The arm 61 is, as best shown in Figure 4, mounted loosely on the cross shaft 18 for generally vertical swinging movement relative thereto, and at a point well toward the forward end of the arm 61 the latter is provided with an aperture in which the lower end of a generally upwardly extending link 62 is received. The upper end of the link 62 is pivoted to the rear end of a leveling lever 64 which is mounted on or fixed to a second cross shaft 65 carried by the draft brackets 15 above and slightly forward of the cross shaft 18. The forward end of the arm 64 carries a swivel eye 67 in which the upper threaded end of a link 68 is adjustably received, being fixed to the swivel eye 67 by a pair of lock nuts 69. The lower end of the link 68 is pivoted in the forward apertured end of an arm 71 that is fixed to the right end (as viewed in Figure 2) of the cross shaft 18. Thus, the extension 47, the link 56, the arm 61, the link 62 and the lever 64, together with the associated parts, constitute a leveling linkage which is connected between the plow beam 23 and the tractor and is operated by a connection with the front bell crank 21, 22, which connection includes the arm 71 and the link 68.

The operation of the plow constructed as described above is substantially as follows.

Referring first to Figure 7, which shows the outfit in a transport or inoperative position, when the farmer starts to plow a field, he moves the lever 37 substantially all the way rearwardly, assuming that conditions are such that he can open up the land at approximately full depth. The clockwise movement of the hand lever 37 (Figure 7) as just described, swings the arm 36 thereof downwardly. The resulting downward movement of the link 34 which is connected at its lower end to the pivotal junction between the two links 25 and 26, permits the bell crank 28 at the rear of the tractor to swing in a clockwise direction under the influence of the weight of the rear end of the plow, since the two bell crank members 28 and 21, 22 are both connected with the plow beam forward of the plow bottom 24, and therefore the center of gravity of the plow lies much nearer the rear bell crank member 28 than the forward bell crank member 21, 22. This movement continues, as the hand lever 37 is shifted rearwardly from its position shown in Figure 7, until the plow comes into contact with the ground. As will be clear from Figure 7, up to this point the effect of the weight of the plow is to swing the bell crank 28 in a clockwise direction, thus serving to hold the arm 22 up against the stop 41 carried on the right-hand draft bracket 16. However, after the plow bottom comes into contact with the ground, continued rearward movement of the hand lever 37 then results in swinging the hitch bell crank 21, 22 in a clockwise direction, the arm 22 moving away from the stop 41 and the other arm 21 moving downwardly so as to lower the hitch point 53. The farmer need not wait until the plow bottom actually enters the ground before moving the lever 37 into the notch selected for the desired depth of opening. Instead, the farmer may immediately move the lever 37 all the way to the rear of the sector 38, this movement eventually swinging the hitch point 53 into an advantageously lowered position, as shown in dotted lines in Figure 7. This is especially desirable since it tends to pull the plow into the ground quickly. Due to the suction of the plow bottom 24 the latter soon reaches the desired depth of operation, the rear end of the beam continuing to swing downwardly after the lever 37 is latched to the sector 38. During this movement the action of the linkage parts, including the motion-transmitting links 25 and 26 and the adjustably mounted control link 34, also results in a slight additional lowering of the hitch point 53 so that, in effect, during the land opening position of the plow the latter swings generally about a virtual hitch point well forward of the point of actual physical connection with the hitch arm 21. This is the same as a long beam connection and produces a very steady running plow even though the surface of the ground over which the tractor passes is uneven. In order to illustrate this action two different positions of the plow bottom have been indicated at P¹ and P² in dotted lines in Figure 3 from which the swinging of the plow relative to the tractor about a forward virtual hitch point will be observed.

After the operator has completed his opening up round, he is then ready to begin normal plowing, which is the position shown in Figure 1, with one wheel of the tractor operating in the previously opened furrow. Due to the now lowered position of the tractor, the operator will swing the lever 37 forward into its normal operating range. This results in a repositioning of the hitch linkage, in substantially the relations shown in Figure 1, and the parts are so arranged that, when operating in this position, the plow no longer swings about a forwardly disposed virtual hitch point but, instead, swings generally about a virtual hitch point (V², Figure 6) lying very close to the bottom of the furrow, or, with respect to the tractor, lying quite close to the bottom of the tractor wheel that runs in the previously opened furrow, such tractor wheel being shown in dotted lines in Figure 6. When the linkage is thus arranged in what may be termed a normal plowing position, the rear tractor wheels, particularly the wheel operating in the previously opened furrow becomes, in effect, a gauge for the plow, and in traversing uneven ground, for example, the plow maintains a depth of plowing that is determined by the position of the tractor wheel, particularly the right hand tractor wheel where the plow is a right hand plow. Two relatively extreme positions are illustrated in Figure 6 to show this action. It will be observed that this action of the plow in normal plowing differs materially from the action of the plow when opening up the land. That is to say, when opening up the land the plow swings generally about a forward virtual hitch point so that up and down movements of the rear end of the tractor has very little effect upon the position of the plow. Hence, when opening up the land, minor variations of the ground surface do not cause appreciable variations in the bottom of the furrow, and therefore hence, a constant average depth of plowing is maintained and the bottom of the furrow is level and uniform. This is important because, as just described above in connection with Figure 6, the bottom of the furrow, together with the tractor wheel that runs in the furrow, becomes a gauge for all subsequent plowing, for when the parts are arranged for normal plowing the plow swings about a virtual hitch point on the tractor that lies very close to the bottom of the rear furrow wheel.

It will also be noted that when the plow is in its lifted or transport position (Figure 7) the arm 22 is up against the stop 41 and the links 25 and 26 are disposed at a fairly small angle. This particular relationship serves to reduce the load which the latched hand lever 37 is required to sustain when holding the plow up in its raised position for transport. If desired, the hitch linkage and associated parts might be arranged so that the links 25 and 26 approach or actually pass slightly through a straight line relationship in which the hand lever 37 would be relieved of all loads, for all practical purposes, so far as holding the plow up in its transport position is concerned. When the plow is in its normal plowing position (Figure 1) the arm 21 is substantially in line with the line of pull from the center of resistance of the plow bottom to the draft shaft 18 and therefore the bell crank 21, 22 is held more or less in a constant position, largely by the draft pull. However, the pressure of the soil acting downwardly against the plow bottom and tending to rock the same generally about the point of contact between the rear wheel 42 and the furrow bottom tends to swing the front end of the beam 23 downwardly. This is, however, restrained by hitch connection with the tractor through the link 31 and the bell crank 28, together with the linkage connection between the front end of the beam and the bracket 15 and hand lever 37. This additional load on the tractor increases the tractive power of the rear wheels of the tractor and makes it possible to pull comparatively large size plow bottoms with a light tractor. When the plow is in a position opening up the land, as shown in Figure 3, the arm 21 extends downwardly at a fairly sharp angle and the generally rearwardly directed draft pull tends to rock the bell crank 21, 22 in a counterclockwise direction (Figure 3). However, at this time the links 22, 25 and 34 are arranged at a fairly small angle, and hence the tendency for the bell crank 21, 22 to swing is resisted with increased effectiveness by the weight of the rear end of the plow, together with the downward pressure of soil on the plow bottom, acting through the bell crank 28 to tend to swing the link 26 forwardly. In addition, the downward pressure of the soil against the plow bottom, acting about the wheel 42 as a fulcrum, also tends to keep the front end of the beam 23 in a lower position, which again adds weight, in effect, to the tractor and increases the tractive power thereof.

As mentioned above, the leveling linkage, best shown in Figures 2, 4 and 5, is so arranged that when the hand lever 37 is swung into its land opening position, which may be in any one of the several rearmost notches in the sector 38, the leveling linkage is arranged in about the position shown in Figure 5, the angles and length of parts and disposition of pivots being such that the plow bottom 24 is maintained in substantially an upright position with respect to the tractor. However, for normal operating position (Figure 1) the leveling linkage is arranged in about the positions shown in Figure 4. It will be understood, of course, that sufficient notches are provided on the sector 38 to provide the desired number of different plowing positions, and by swinging the hand lever 37 into the several positions, the leveling linkage, which is shown in Figure 4 in its normal operating position, acts to swing the plow into the desired angle so that the plow forms a level furrow bottom, thus taking into account the angle of tip of the tractor. As will be readily understood, the deeper the furrow when plowing normally, the greater will be the lateral tilt of the tractor, and hence the greater will be the amount of angling of the plow bottom relative to the tractor (see Figure 2) to accommodate the tilting of the tractor. In other words, the parts are so arranged that, during its depth adjusting range, rearward movement of the hand lever 37 acts through the leveling linkage (Figures 2 and 4) to increase in a clockwise direction (Figure 2) the angle between the tractor and the plow bottom, and similarly, as the hand lever 37 is moved forwardly to decrease the depth of plowing the leveling linkage operates to reduce this angle, or, in other words, to swing the plow bottom 24 in a counterclockwise direction (Figure 2) relative to the tractor.

This action continues when raising the plow into a raised or transport position, as shown in Figure 7. The forward movement of the hand lever 37 from about the position shown in Figure 1 to about the position shown in Figure 7, results not only in raising the rear of the plow into its transport position but, in addition, results in swinging the bell crank 21, 22 into a position where the arm 22 engages the stop 41. Looking at Figure 4, this movement causes the arm 71 to swing downwardly from the position shown in Figure 4, and in so doing the resulting clockwise swinging of the link 64 swings the plow bottom in the other direction, that is, the point of the plow is raised while the furrowward edge of the plow bottom is angled downwardly in a lateral direction. This is, of course, in addition to the actual raising of the plow bottom as a whole. Tipping the plow bottom in a furrowward direction relative to the tractor, or in a counterclockwise direction as viewed in Figure 2, has the advantage of freeing the plow bottom of the last portion of the furrow slice which overlies the share and moldboard at the moment the plow emerges from the ground.

This result is achieved by arranging the leveling linkage (Figures 4 and 5) so that in the opening-up position, Figure 5, when the front of the plow beam 23 is in its lowermost position relative to the tractor, Figure 3, and about parallel to the bottom of the tractor, the links 62 and 68 of the leveling linkage are close to a straight line position relative to the arms 64 and 71, as shown in Figure 5. Hence, when the lever 37 is moved back to a normal plowing position, at which time the tractor normally operates in a tilted position with one rear wheel in the furrow (Figure 2), there is only a small amount of upward movement of the rear end of the arm 59, and hence the outer end (right end as viewed in Figure 2) of the bracket 47 moves up relative to the tractor very little, thus providing the proper position for the plow bottom to compensate for the tilted position of the tractor (Figure 2). However, as the lever 37 is moved forward to a position for more shallow operation or for transport the links 62 and 68 move into positions (Figure 4) approaching perpendicularity relative to the arms 61 and 71, and hence as the lever 37 is moved forwardly the resulting clockwise movement (Figures 4 and 6) of the shaft 18 and arms 21 and 71 now acts through lever 64 to raise the rear end 59 of arm 61 with an accelerated motion so that when the plow is in its transport position (Figure 7) the bracket 47 is again about parallel to the bottom of the tractor. It will thus be seen that in the opening-up range of the lever 37 and depth controlling linkage, the leveling linkage connected therewith moves very little relative to the tractor, but in the normal plowing range of the depth controlling linkage the leveling linkage operates to tilt the plow bottom to increase or decrease the amount of tilt relative to the tractor according to whether the depth of plowing is increased or decreased.

The modified form of implement shown in Figures 8 and 9 and described in detail below, is provided with the same kind of leveling linkage as described above, but for purposes of clarity the leveling linkage has been omitted from Figures 8 and 9. The action of the leveling linkage of Figures 8 and 9 is the same as has just been described.

Figures 8 and 9 illustrate a slightly modified form of construction which is quite similar to that described above and, in fact, many of the parts are identical with those described above. Such identical parts are indicated by the same reference numerals employed above. In this form of the invention the arm 36 of the hand lever 37 is connected by a pair of links 101 and 102 with the arm 22 of the bell crank 21, 22. In this form of the invention the lower end of the link 101 is pivoted at 104 to an intermediate point on the link 102, the lower end of the latter receiving the front end 105 of the longitudinally extending link 26. The link 101 is provided with a stop 107 which, as best shown in Figure 9, is adapted to engage the lower edge of the hand lever arm 36. By having the link 102 longer than the distance from the pivot 19 to the pivot 104, a somewhat greater lifting movement is secured but without affecting the position of the rear bell crank 28 when in normal operating position, since, as best shown in Figure 8, the link 102 is substantially vertical during normal operation. The stop 107 on the link 101 serves to replace the stop 41 shown in the form of the invention illustrated in Figures 1-7, and has the advantage that the raising action is somewhat more smooth, particularly after the stop 107 engages the arm 36, since at and beyond this point the movement of the hand lever 37 toward its raised position merely causes the point 104 (Figure 9) to swing about the pivot 139 of the hand lever 37.

The operation of the form of the invention shown in Figures 8 and 9 is substantially the same as the previously described form, and hence further description is believed to be unnecessary. The position of the parts when the plow of Figures 8 and 9 is lowered into land opening position, is indicated in dotted lines in Figure 9. In Figure 8 the two dotted line positions indicate the swinging action of the plow point generally about a virtual center at or adjacent the point where the rear tractor wheels engage the ground. When the plow is in its land opening position (dotted lines, Figure 9), the plow bottom swings generally about a virtual hitch point well forward toward the front end of the tractor, in the same manner as described above in connection with Figures 1–7.

Figure 10 shows a modified form of the present invention wherein provision is made for a considerable extent of lateral swinging of the plow without disturbing the action of the linkage. Referring for the moment to Figure 1, it will be seen that the rear end of the plow beam 23 is connected with the arm 28 by a link 31, and therefore, if the plow beam should swing laterally with respect to the tractor through a considerable extent, either in one direction or the other, as might occur when plowing around a fairly sharp curve, any lateral movement of the plow will be attended by a certain amount of raising action. This arises, as will be readily understood, by virtue of the fact that the link 31 swings about a point at the outer end of the arm 28, and hence any movement of the link 31 in one lateral direction or the other causes the point 32 to be raised. Although the amount is slight and for ordinary plowing may be ignored, it may occur that the outfit may be employed where it is desired to keep the plow in the ground even while plowing around fairly sharp corners. In order to provide an arrangement which accommodates a considerable amount of lateral swinging of the plow beam relative to the tractor but without losing the advantages of the linkage arrangement shown and described above, I may provide the modified form of the present invention shown in Figure 10, in which a pair of arms, indicated by the reference numerals 28a and 28b, are secured, as by welding, to the rockshaft 30 that is carried in the supports 29 at the rear of the tractor. The arms 28a and 28b are in addition to the arm 33 that is connected by the link 26 and associated parts with the controlling linkage connected between the front of the plow beam and the tractor. The arms 28a and 28b are welded or otherwise fixed to the shaft 30 in a certain angular relation, and the arm 28a is appreciably longer than the other arm 28b. A shaft or bar 125 is carried at the outer ends of the arms 28a and 28b and receives a tubular slide member 126 having a lower lug 127 which is connected by a link 31' to the beam 23. The parts are so disposed with respect to each other and with respect to the cooperating parts that when the tractor 1 is tilted, as in normal plowing (Figure 1), the bar 125 is for all practical purposes horizontal with respect to the ground surface. Since the arms 28a and 28b are fairly widely spaced apart, the slide 126 may take any position along the bar 125 without changing any of the positions of the linkage and, what is more important, without making any alterations in the normal operating depth of plowing. When opening up the land for the first time (Figure 3), the bar 125 stands at a slight angle to the horizontal, but when the arm 33 is rocked into its rearmost position, when raising the plow into transport position (Figure 7), the long arm 28a swings upwardly to such a degree that the bar 125 inclines laterally toward the right side of the tractor, thus insuring that the slide 126 and the plow beam 23 will occupy a position well toward the right of the bar 125, which is the normal position of the plow (Figure 2).

The construction just described is applicable either to the plow shown in Figures 1–7 or to the plow shown in Figures 8 and 9.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a plow, a mobile frame, a plow beam having a laterally extending portion, a draft transmitting part mounted on said mobile frame for rocking movement about a transverse axis and having two arms fixed thereto, one arm being connected to transmit draft to the front end of said beam and to raise and lower the front end of the latter when said part is rocked about said axis, the second of said arms being rockable with said first arm, a member operatively connected with the outer end of said laterally extending portion, and means connecting said member with said second arm whereby movement of said draft transmitting part acts through said member and said laterally extending portion to shift said plow beam about a fore and aft extending axis.

2. The invention set forth in claim 1, further characterized by said connecting means including a pair of pivotally interconnected and angularly movable parts, one connected with said member and the other connected with said second arm, said parts being movable substantially into a dead center relation in one position of said rockable draft transmitting part.

3. A tractor mounted plow comprising a plow beam, means on the tractor for transmitting draft to the plow beam and including a rockshaft on the tractor having two arms, means pivotally connecting one arm with the plow beam for vertically adjusting the latter, a lateral extension on the beam, and a connection extending between the other arm and said lateral extension for tilting the latter about a generally longitudinal axis when said rockshaft is rocked.

4. In a plow, a mobile support, a plow beam having a furrow opener fixed to the rear end thereof, a pair of members mounted on said mobile support, one connected between the front end of said beam and said support and the other connected between said support and the rear end of said beam, a pair of pivotally interconnected links pivoted, respectively, to said members, and a control member connected with said links at the point of their pivotal connection.

5. A tractor mounted plow comprising a generally longitudinally extending beam having a plow bottom at the rear end thereof, a bell crank mounted on the rear portion of the tractor and having one arm connected with the rear of the plow beam, a second bell crank connected with the tractor and having one arm connected with the front end of the plow beam, a pair of links, one connected at its outer end to each of said bell cranks, an elongated part, means for connecting the inner end of each of said links to one end of said elongated part, an adjustable part adapted to be movably mounted on the tractor, and means for connecting the other end of said elongated part to said adjustable part, whereby movement of said adjustable part acts through said elongated part and said links for controlling the ratio of movement of one bell crank relative to the other, so as to control the virtual center about which the plow bottom moves when said bell cranks swing relative to the tractor.

6. In a plow, a mobile support, a generally longitudinally extending beam carrying a ground engaging tool at its rear end, a generally vertically swingable linkage connecting the front end of said beam with said support and adapted to be moved between a lowered position, as for opening up the land, to a position for normal plowing after the land has been opened up, a generally laterally extending part on said beam, and a leveling linkage connected between said part and said first linkage to tilt the beam about its longitudinal axis, said leveling linkage including parts movable into substantially dead center relationship so as to reduce the amount of tilt relative to the tractor when said generally vertically swingable linkage is in its lowered position and into an angular relationship to increase the amount of tilt when said latter linkage is in its normal plowing position.

7. A tractor mounted plow comprising a plow beam, means on the tractor for transmitting draft to the plow beam and including a rockshaft on the tractor having two arms, means pivotally connecting one arm with the plow beam for vertically adjusting the latter between a lowered position, as for opening up the land, and a higher position, relative to the tractor, for normal plowing in which the tractor occupies a tilted position relative to the ground surface, and motion-transmitting means connecting the other arm with the beam for tilting the latter about a generally longitudinal axis, said means including a part movable relative to the tractor about an axis spaced from said rockshaft, means connecting said part with said plow beam and a link pivotally connected with said part and said arm, said arm and link moving into substantially dead-center relationship when the beam is moved into said lowered position so as to hold said beam in a generally upright position relative to the tractor when said one arm and said plow beam are in their positions for opening up the land.

8. In a tractor mounted plow, a longitudinally extending plow beam, a pair of bell cranks each having two arms, means including one arm of each of said bell cranks for connecting said beam at fore and aft spaced points with the tractor, a pair of pivotally interconnected links connected respectively with the other arms of said bell cranks, a swinging link connected at one end with said pivotally interconnected links adjacent the point of their interconnection, and means adapted to be adjustably fixed to the tractor for connecting the other end of the swinging link with the tractor.

9. In a tractor mounted plow, a longitudinally extending plow beam, a pair of bell cranks each having two arms, means including one arm of each of said bell cranks for connecting said beam at fore and aft spaced points with the tractor, a pair of pivotally interconnected links connected respectively with the other arms of said bell cranks, a swinging link connected at one end with said links adjacent the point of their interconnection, and a movable part attachable to the tractor and connected with the other end of said swinging link.

10. The invention set forth in claim 9, further characterized by said movable part being disposable in a position to act through said swinging link and said pivotally interconnected links whereby movement of the rear bell crank in one direction causes movement of the other bell crank in the opposite direction.

11. The invention set forth in claim 9, further characterized by said movable part being disposable in a position to act through said swinging link and said pivotally interconnected links whereby movement of the rear bell crank in one direction causes movement of the other bell crank in the same direction.

12. In a tractor mounted plow, a longitudinally extending plow beam, a pair of bell cranks each having two arms, means including one arm of each of said bell cranks for connecting said beam at fore and aft spaced points with the tractor, a pair of pivotally interconnected links connected respectively with the other arms of said bell cranks, a swinging link connected at one end with said links adjacent the point of their interconnection, and a movable part on the tractor pivotally receiving the other end of said swinging link and shiftable to various positions to raise and lower said swinging link so as to vary the virtual hitch point about which the plow beam moves relative to the tractor.

13. The invention set forth in claim 8, further characterized by leveling linkage connected between the front end of said beam and the tractor, and a connection extending between the front bell crank and said linkage whereby the leveling linkage is operated by movement of said front bell crank.

14. In a plow, a mobile support, a plow beam having a furrow opener fixed thereto, a generally vertically movable draft-transmitting member connecting the front end of said beam with said mobile support, a part movably mounted on said support and connected with the rear portion of said beam so as to be moved in one direction in response to generally upward movement of the rear end of said beam relative to said support, and motion-transmitting means connected with said draft-transmitting member and said part and actuated by movement of the latter in said one direction for moving said draft-transmitting member in a direction to lower the front end of the beam when the rear end of said beam is moved upwardly.

15. In an agricultural implement, a support, a ground working tool, means connecting said ground working tool with the support comprising a pair of bell cranks connected for free swinging movement with said support and each including a generally vertically movable arm and a generally fore and aft swingable arm, means connecting the generally vertically movable bell crank arms with the front and rear portions, respectively, of said tool, a pair of pivotally interconnected links connected, respectively, to the fore and aft swingable arms of said bell cranks, a third link pivotally connected at one end to said pair of links adjacent their point of interconnection, an actuating member adjustably connected with said support for swingably connecting said third link therewith, said member being movable into one position relative to the forward bell crank so that the bell cranks are movable so as to cause said tool to swing generally about a virtual hitch point adjacent the rear of the support and the ground surface, movement of said actuating member into another position acting through said third link and said pair of interconnected links to constrain the relative movement of said bell cranks so as to cause said tool to swing generally about a hitch point adjacent the forward portion of the support, means for shifting said actuating member from one position to another, and leveling mechanism including an arm movable with the forward bell crank and means including a link pivoted to said arm and operatively connected with said tool for tilting said tool laterally when said forward bell crank moves through a first range of movement, said arm and link being movable into such angular relationship when said forward bell crank moves through a second range of movement that said tool is held substantially against lateral tilting.

16. In a plow, a mobile support, a plow beam having a furrow opener fixed thereto, a pair of fore and aft spaced bell cranks pivoted on said support and connected with said plow beam at fore and aft spaced points, a plurality of pivotally interconnected motion-transmitting links pivotally connected at their outer ends to said bell cranks, respectively, means movably mounted on said support and connected with the inner ends of said pivotally interconnected links for constraining said inner ends of said links to move through a given path relative to the axes of pivoting of said bell cranks, whereby movement of one bell crank causes movement of the other, and means carried by said support and connected with said movably mounted means for changing the position of the latter relative to said axes so as to modify the amount of movement imparted to one bell crank by a given amount of movement of the other bell crank.

17. In a plow, a mobile support, a plow beam having a furrow opener fixed to the rear end thereof, a lifting member movable on said support, front and rear parts movably connected, respectively, between the front and rear portions of said plow beam and said mobile support for raising and lowering the plow beam, differential linkage connected with said front and rear parts and comprising a pair of links connected, respectively, with said front and rear parts, and means pivotally interconnecting said links, the latter being normally disposed at an angle to one another, movable means connected between said links adjacent the point of their interconnection and said lifting member and acting generally transversely of said links for causing the latter to shift said front and rear parts for raising and lowering said plow beam, and stop means disposed in a position to engage said front raising and lowering part for limiting the upward movement of the front end of said beam and the associated part of said linkage whereby further movement of said lifting member acts through said linkage to raise the rear end of the plow beam.

18. In a tractor plow, a plow beam, a lifting connection between the rear portion of said plow beam and the tractor, a second lifting connection between the front portion of said plow beam and the tractor, said lifting connections being made with said plow beam at such points therewith that the effective center of gravity lies closer to the second connection, plow controlling means including an actuating member, linkage connecting said actuating member with said lifting connections, said linkage comprising a pair of interconnected parts connected, respectively, with said first and second lifting connection, shiftable means connected with said actuating member and said parts adjacent the point of their interconnection for shifting either of the parts when the other of said parts is prevented from moving, and stop means engageable by the front lifting connection for defining the point where movement of the rear lifting connection is initiated.

19. In a plow, a mobile support, a plow beam having a furrow opener at the rear end, said mobile support including ground engaging means at each side, said ground engaging means at one side being adapted to run in a previously opened furrow when in normal operation and the ground engaging means at both sides being adapted to run on top of the ground surface when opening up the land, mechanism for hitching the plow beam to said mobile support and including front and rear swingable members movable about generally transverse axes spaced apart in a generally fore and aft direction pivotally connecting the plow beam with said support, pivotally interconnected links connecting said swingable members, and a swingable part shiftably mounted on said support and connected with said links adjacent their point of interconnection so as to control the relative movement of said swingable members and thus provide, during normal operation, for free relative movement between the plow beam and mobile support about a virtual hitch point adjacent the ground surface and adjacent the point of contact of the rear wheels of said mobile support with the ground, and means for shifting the point of connection of said swingable part on said support whereby said swingable members are caused to move so that said furrow opener moves substantially about a virtual hitch point disposed adjacent the forward end of the mobile support.

20. A tractor mounted plow comprising a generally longitudinally extending beam, a plow bottom at the rear thereof, and movable connections between the tractor and the front and rear ends of said beam, said movable connections including front and rear swingable members swingably connecting front and rear portions of said beam with the tractor, and motion-reversing means connecting said swingable members so that the portions thereof that are connected with said plow beam are constrained for movement in opposite directions, whereby when the rear end of said beam moves upwardly or downwardly, relative to the tractor, the front end moves downwardly or upwardly, respectively.

FRANK T. COURT.

(References on following page)

REFERENCES CITED

The following references are of record in the file of this patent:

UNITED STATES PATENTS

| Number | Name | Date |
|---|---|---|
| Re. 21,989 | Morkoski | Dec. 30, 1941 |
| 820,887 | McGuire | May 15, 1906 |
| 1,378,842 | Dittbrenner | May 24, 1921 |
| 1,422,350 | Emerson | July 11, 1922 |
| 1,479,994 | Krotz | Jan. 8, 1924 |
| 1,687,719 | Ferguson | Oct. 16, 1928 |
| 1,745,472 | Brown et al. | Feb. 4, 1930 |
| 1,831,997 | Brown | Nov. 17, 1931 |
| 2,012,458 | Strandlund | Aug. 27, 1935 |
| 2,167,210 | Imsick | July 25, 1939 |
| 2,302,502 | Morkoski et al. | Nov. 17, 1942 |
| 2,339,830 | Zink et al. | Jan. 25, 1944 |
| 2,354,084 | Geraldson | July 18, 1944 |
| 2,357,847 | Ray | Sept. 12, 1944 |
| 2,366,281 | Mott | Jan. 2, 1945 |
| 2,395,322 | Evans | Feb. 19, 1946 |
| 2,405,334 | Silver | Aug. 6, 1946 |
| 2,416,194 | Miller | Feb. 18, 1947 |